(12) United States Patent
Bolourchi et al.

(10) Patent No.: US 7,835,836 B2
(45) Date of Patent: Nov. 16, 2010

(54) METHODS, SYSTEMS, AND COMPUTER PROGRAM PRODUCTS FOR CALCULATING A TORQUE OVERLAY COMMAND IN A STEERING CONTROL SYSTEM

(75) Inventors: Farhad Bolourchi, Novi, MI (US); Steven D. Klein, Munger, MI (US); Edward J. Bedner, Brighton, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 999 days.

(21) Appl. No.: 11/557,673

(22) Filed: Nov. 8, 2006

(65) Prior Publication Data
US 2008/0109134 A1 May 8, 2008

(51) Int. Cl.
*B62D 5/04* (2006.01)

(52) U.S. Cl. .................. 701/41; 340/465; 180/421; 180/197; 180/446

(58) Field of Classification Search ............. 701/41–43, 701/70, 72; 180/271, 421, 422, 443, 446, 180/197; 280/5.5; 303/140, 146, 150; 340/440, 340/438, 465; 477/34, 107; *B62D 5/00*
See application file for complete search history.

(56) References Cited

U.S. PATENT DOCUMENTS

| | | | |
|---|---|---|---|
| 6,456,920 B1* | 9/2002 | Nishio et al. ................... | 701/70 |
| 6,547,343 B1 | 4/2003 | Hac | |
| 6,549,842 B1* | 4/2003 | Hac et al. ..................... | 701/80 |
| 6,655,493 B2 | 12/2003 | Menjak et al. | |
| 6,840,343 B2 | 1/2005 | Mattson et al. | |
| 6,899,952 B2* | 5/2005 | Shimizu .................. | 428/411.1 |
| 7,137,673 B2* | 11/2006 | Anwar ........................ | 303/146 |
| 7,454,279 B2* | 11/2008 | Fujioka et al. ................ | 701/70 |
| 2004/0225427 A1* | 11/2004 | Anwar ......................... | 701/38 |
| 2004/0238261 A1* | 12/2004 | Kodama et al. ............. | 180/443 |
| 2005/0189163 A1* | 9/2005 | Barton et al. ............... | 180/446 |
| 2005/0206299 A1* | 9/2005 | Nakamura et al. .......... | 313/495 |
| 2006/0048976 A1* | 3/2006 | Deguchi et al. ............. | 180/6.5 |
| 2006/0089770 A1* | 4/2006 | Ito ............................... | 701/41 |
| 2006/0125313 A1* | 6/2006 | Gunne et al. .................... | 303/7 |
| 2006/0259222 A1* | 11/2006 | Farrelly et al. ................ | 701/42 |
| 2007/0021875 A1* | 1/2007 | Naik et al. ..................... | 701/1 |
| 2008/0133066 A1* | 6/2008 | Takenaka ........................ | 701/1 |
| 2008/0142293 A1* | 6/2008 | Goto et al. ................... | 180/446 |
| 2009/0012685 A1* | 1/2009 | Maeda et al. .................. | 701/70 |

FOREIGN PATENT DOCUMENTS

JP  2002173043 A  *  6/2002
JP  2006282065 A  *  10/2006

* cited by examiner

*Primary Examiner*—Tuan C To
(74) *Attorney, Agent, or Firm*—Cantor Colburn LLP (57) ABSTRACT

A method, system, and computer program product for calculating a torque overlay command in a steering control system is provided. The method includes receiving a current hand wheel angle, receiving a change in vehicle yaw moment command, and calculating a lateral force in response to the change in vehicle yaw moment command. The method also includes determining a new tire side slip angle from the lateral force and calculating a commanded hand wheel angle from the new tire side slip angle. The method further includes calculating an error signal as a difference between the commanded hand wheel angle and the current hand wheel angle, and generating a torque overlay command from the error signal.

4 Claims, 6 Drawing Sheets

FIG. 8

METHODS, SYSTEMS, AND COMPUTER PROGRAM PRODUCTS FOR CALCULATING A TORQUE OVERLAY COMMAND IN A STEERING CONTROL SYSTEM

FIELD OF THE INVENTION

This invention relates to a steering control system, and more particularly, to methods, systems, and computer program products for calculating a torque overlay command in a steeling control system.

BACKGROUND

Some advanced vehicle control systems include vehicle stability control logic that may assist in keeping a vehicle within a defined performance region. For example, some such systems may calculate a corrective yaw moment of the vehicle and apply brakes to the appropriate wheels when the vehicle exceeds a threshold condition. An example of such a system is described in U.S. Pat. No. 6,547,343 entitled "Brake System Control", of common assignment herewith. Other systems have been contemplated that attempt to augment driver steering commands using a special-purpose assisted steering control system.

In an advanced steering control system, such as Active Front Steering (AFS), a change angle (delta angle) may be added or overlaid to a road wheel angle of a vehicle to produce an augmented total road wheel angle. The driver of the vehicle typically uses a hand wheel or steering wheel to attempt to control the road wheel angle of the vehicle. The delta angle may be calculated in response to various driving conditions, such as a rapid turn or an emergency maneuver, and overlaid to improve vehicle stability and performance. The technique of adding a delta angle to the road wheel angle is also known as angle overlay. Although angle overlay may improve vehicle stability and performance, it also results in a variable relationship between the hand wheel angle and the road wheel angle. Furthermore, such steering control systems may require the use of special purpose hardware, resulting in additional cost and overall vehicle weight.

In some driving conditions, there is a need to impart varying lateral force or torque to the vehicle without changing the relationship between the hand wheel angle and the road wheel angle. Exemplary scenarios include maintaining a relative position within a driving lane, parking assistance, wind gust mitigation, and other stability control scenarios. An angle overlay system may impart additional torque on road wheels, but the primary purpose of the system is to alter the road wheel angle. To control a steering system based upon changes in torque, a new method must be developed independent of an angle overlay system. Additional advantages may be realized through imparting additional positive or negative torque using existing steering control systems, such as electric power steering (EPS) or hydraulic power steering (HPS) systems.

Accordingly, there is a need for a method for calculating a torque overlay command in a steering control system.

SUMMARY

The shortcomings of the prior art are overcome and additional advantages are provided through the provision of methods, systems, and computer program products for calculating a torque overlay command in a steering control system. The method includes receiving a current hand wheel angle, receiving a corrective vehicle yaw moment command, and calculating a lateral force. The method also includes determining a new tire side slip angle from the lateral force and calculating a commanded hand wheel angle from the new tire side slip angle. The method further includes calculating an error signal as a difference between the commanded hand wheel angle and the current hand wheel angle, and generating a torque overlay command from the error signal.

System and computer program products corresponding to the above-summarized methods are also described and claimed herein.

The above-described and other features will be appreciated and understood by those skilled in the art from the following detailed description, drawings, and appended claims.

BRIEF DESCRIPTION OF THE DRAWINGS

Referring now to the Figures wherein like elements are numbered alike.

The detailed description explains the exemplary embodiments of the invention, together with advantages and features, by way of example with reference to the drawings.

DESCRIPTION OF PREFERRED EMBODIMENTS

In exemplary embodiments, the systems and methods described herein calculate a torque overlay command from vehicle stability signals. The torque overlay command may modify steering torque to assist a driver of a vehicle in maintaining control of the vehicle with less physical exertion.

Exemplary embodiments of the present invention may be utilized in various types of vehicles employing electronic steering or steer-by-wire systems or with the addition of an electric motor on a hydraulic power steering system or with a hydro-electric type actuators. In exemplary embodiments, the systems and methods may be applied to an automobile employing an electric power steering (EPS) system. While exemplary embodiments are shown and described by illustration and reference to an automobile steering system, it will be appreciated by those skilled in the art that the invention is not limited to automobiles alone. To the contrary, torque overlay commands may be applied to all vehicles employing electronic steering systems, steer-by-wire systems, or even hydraulically controlled steering systems where torque overlay command logic may be integrated with existing steering commands. Furthermore, although reference is made herein to a front wheel steering control system, the inventive principles may also apply to rear wheel and all wheel steering systems.

Many modern vehicles may have an EPS system that convert a driver's hand wheel angular position ($\theta_{HW}$) into a vehicle road wheel angular position ($\theta_{RW}$). An EPS system may use an electric motor to apply a sufficient torque to turn the vehicle road wheels, enabling the vehicle to maneuver laterally without excessive effort from the driver. Under conditions such as a rapid hand wheel movement, a wind gust, or variations in the coefficient of friction ($\mu$) between the vehicle road wheels and the road, the vehicle's yaw stability may be upset. A vehicle stability system may utilize various sensors, such as a yaw rate, steering torque, or lateral acceleration, as well as hand wheel angular position and vehicle speed to determine changes in the vehicle's yaw motion. The vehicle stability system may convert the changes in the vehicle's yaw motion into a stability command in the form of a delta yaw moment command. In some vehicles, the delta yaw moment command may be sent to a brake control system, such as the system described in U.S. Pat. No. 6,547,343 entitled "Brake System Control" incorporated herein by reference, or a special add-on active steering control system to impart a corrective vehicle yaw moment through braking or variable ratio road wheel angle adjustments. These corrective actions, particularly braking, may be intrusive and distract the driver of the vehicle. Through the inventive principles described in greater detail herein, the EPS system may use vehicle stability signals, including the delta yaw moment command, to augment steering torque to improve vehicle stability. An advantage of using the EPS system is that the actuator may already exist in many vehicle platforms, eliminating the need for an add-on system. The EPS system may also be used in conjunction with an existing brake control system, with the EPS system providing an early stability response and the more intrusive brake actuation reserved as a last resort to help with stabilization.

Figure 1:
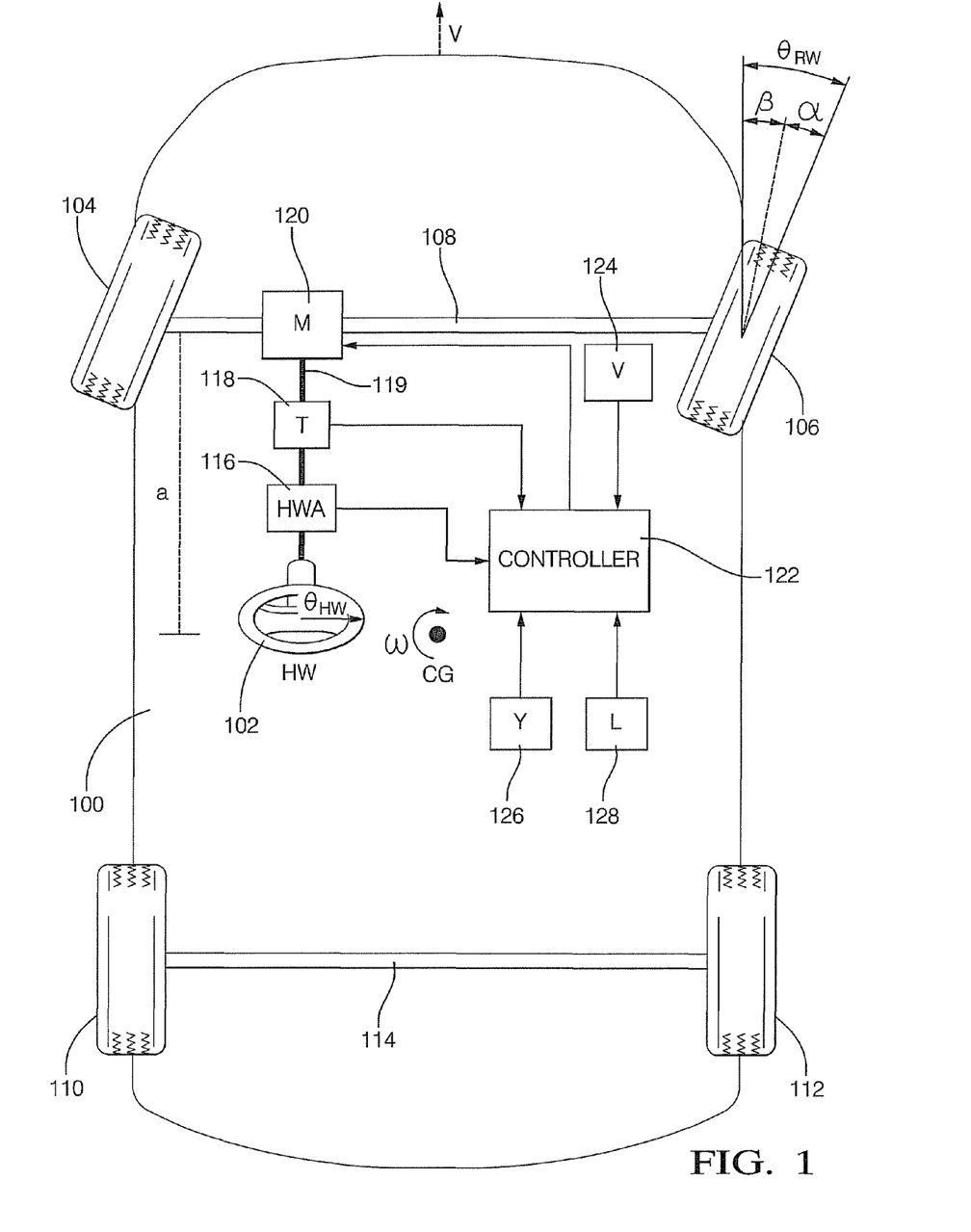
FIG. 1 illustrates one example of a block diagram of a vehicle upon which a torque overlay command calculation may be implemented in exemplary embodiments.

Tuning now to the drawings in greater detail, it will be seen that in FIG. 1 there is diagram of a vehicle 100 upon which a torque overlay command calculation may be implemented in exemplary embodiments. The vehicle 100 of FIG. 1 includes a hand wheel 102 for controlling the angle of a left front road wheel 104 and a right front road wheel 106 in an exemplary front wheel steeling configuration. The left and right front road wheels 104 and 106 are coupled through a front axle 108. The distance between the vehicle 100 center of gravity (CG) and the front axle 108 is represented as "a". The vehicle 100 also includes a left rear road wheel 110 and a right rear road wheel 112 coupled through a rear axle 114. In exemplary embodiments, when a driver of the vehicle 100 rotates the hand wheel 102, the angular position of the hand wheel 102 may be determined through a hand wheel angle sensor 116. Furthermore, the torque exerted by the driver in rotating the hand wheel 102 may be detected through a torque sensor 118. The hand wheel 102 and the front axle 108 may be coupled through a steering shaft 119 and a steering actuator motor and gearing 120 (steering actuator). The steering shaft 119 may include multiple components or subassemblies. The steering actuator 120 may include an electric motor in an EPS system.

While the steering actuator 120 is depicted in FIG. 1 at the coupling junction between the steering shaft 119 and the front axle 108, in exemplary embodiments the steering actuator 120 may be located at or distributed between the steering shaft 119 and the front axle 108, or may be directly coupled with the front axle 108. In exemplary embodiments, changes in the output of the steering actuator 120 turn the left and right front road wheels 104 and 106.

In exemplary embodiments, the vehicle 100 also includes a controller 122, which receives input signals from the hand wheel angle sensor 116, the torque sensor 118, a vehicle speed sensor 124, a yaw rate sensor 126, and a lateral acceleration sensor 128. The controller 122 may generate output signals to the steering actuator 120. Although only a single controller 122 is depicted, it will be understood by those skilled in the art, that the controller 122 may be distributed through multiple control units within the vehicle 100. For example, there may be a local controller at the steering actuator 120 that receives vehicle stability information over a vehicle network from various smart sensors or a centralized control unit.

The vehicle sensors 116, 118, and 124-128 depicted in FIG. 1 may include many types of technologies to produce input signals with or without additional signal conditioning and processing by the controller 122. The hand wheel angle sensor 116 may be any type of sensor capable of generating an angular hand wheel position ($\theta_{HW}$). For example the hand wheel angle sensor 116 may be a resolver, a rotational variable differential transformer (RVDT), an encoder, or a potentiometer. The torque sensor 118 may be any type of sensor capable of producing a signal relative to torque ($\tau$). The torque sensor 118 may be a non-compliant torque sensor, one example of which is described in U.S. Pat. No. 6,655,493 entitled "Steering Column with Non-Compliant Torque Sensor", which is commonly assigned and is incorporated herein by reference in its entirety. The vehicle speed sensor 124 may be a single sensor or a composite of multiple sensors on each drive axle or at each road wheel 104, 106, 110, and 112. In exemplary embodiments, the vehicle speed sensor 124 may utilize a magnetic pick-up to determine the speed (V) of the vehicle 100. The yaw rate sensor 126 may determine the rate of vehicle 100 yaw ($\omega$) with a gyroscope. The lateral acceleration sensor 128 may be an accelerometer. While vehicle sensors 116, 118, and 124-128 are depicted as separate sensors, they may be merged into any combination of modules. Furthermore, the vehicle sensors 116, 118, and 124-128 may be integrated in any combination with the steering actuator 120 or the controller 122. Multiple sensors may be provided for redundancy or improved accuracy. In exemplary embodiments, equivalent vehicle information provided by the vehicle sensors 116, 118, and 124-128 may be extracted or synthesized from a combination of vehicle sensors, including other vehicle sensors not depicted in FIG. 1.

Figure 2:
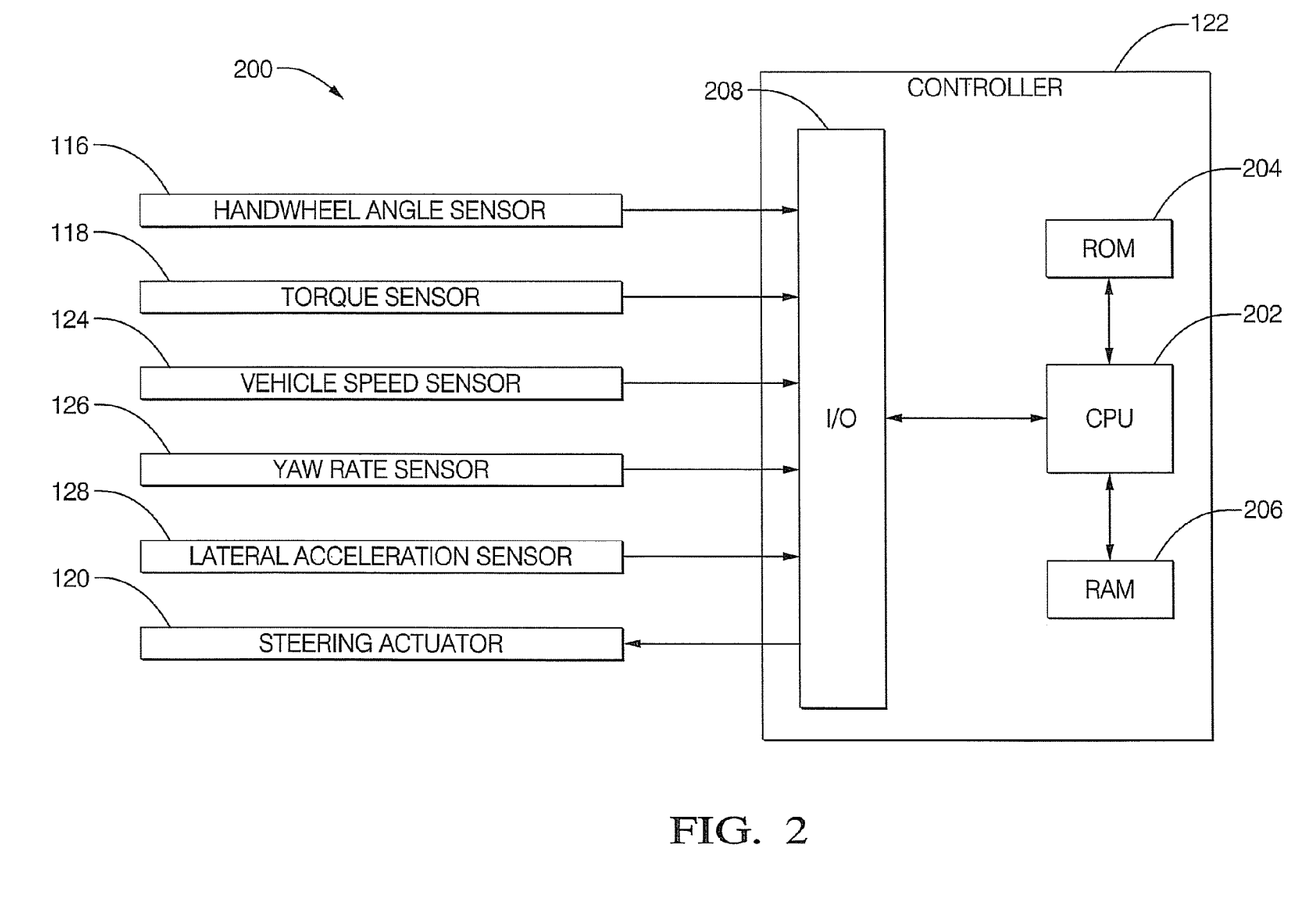
FIG. 2 illustrates a block diagram of the controller used in FIG. 1 in exemplary embodiments.

Turning now to FIG. 2, a block diagram 200 of the controller 122 is depicted in accordance with exemplary embodiments. The controller 122 may collect various vehicle signals to enable the calculation of vehicle stability signals and to control vehicle actuators. The controller 122 may execute computer readable instructions for functions such as vehicle stability logic and torque overlay logic, which may be embodied as computer program products. In exemplary embodiments, the controller 122 includes a central processing unit (CPU) 202, a read-only memory (ROM) 204, a volatile memory such as a random access memory (RAM) 206, and an I/O interface 208. The CPU 202 operably communicates with the ROM 204, the RAM 206, and the I/O interface 208. Computer readable media including the ROM 204 and the RAM 206 may be implemented using any of a number of known memory devices such as PROMs, EPROMs, EEPROMS, flash memory or any other electric, magnetic, optical or combination memory device capable of storing data, some of which represent executable instructions used by the CPU 202. In exemplary embodiments, the CPU 202 communicates via the I/O interface 208 with the hand wheel angle sensor 116, the torque sensor 118, the vehicle speed sensor 124, the yaw rate sensor 126, the lateral acceleration sensor 128, and the steering actuator 120. While vehicle sensors 116, 118, and 124-128 are depicted as separate inputs to the I/O interface 208, the signals may be otherwise coupled, packetized, or encoded.

Figure 3:
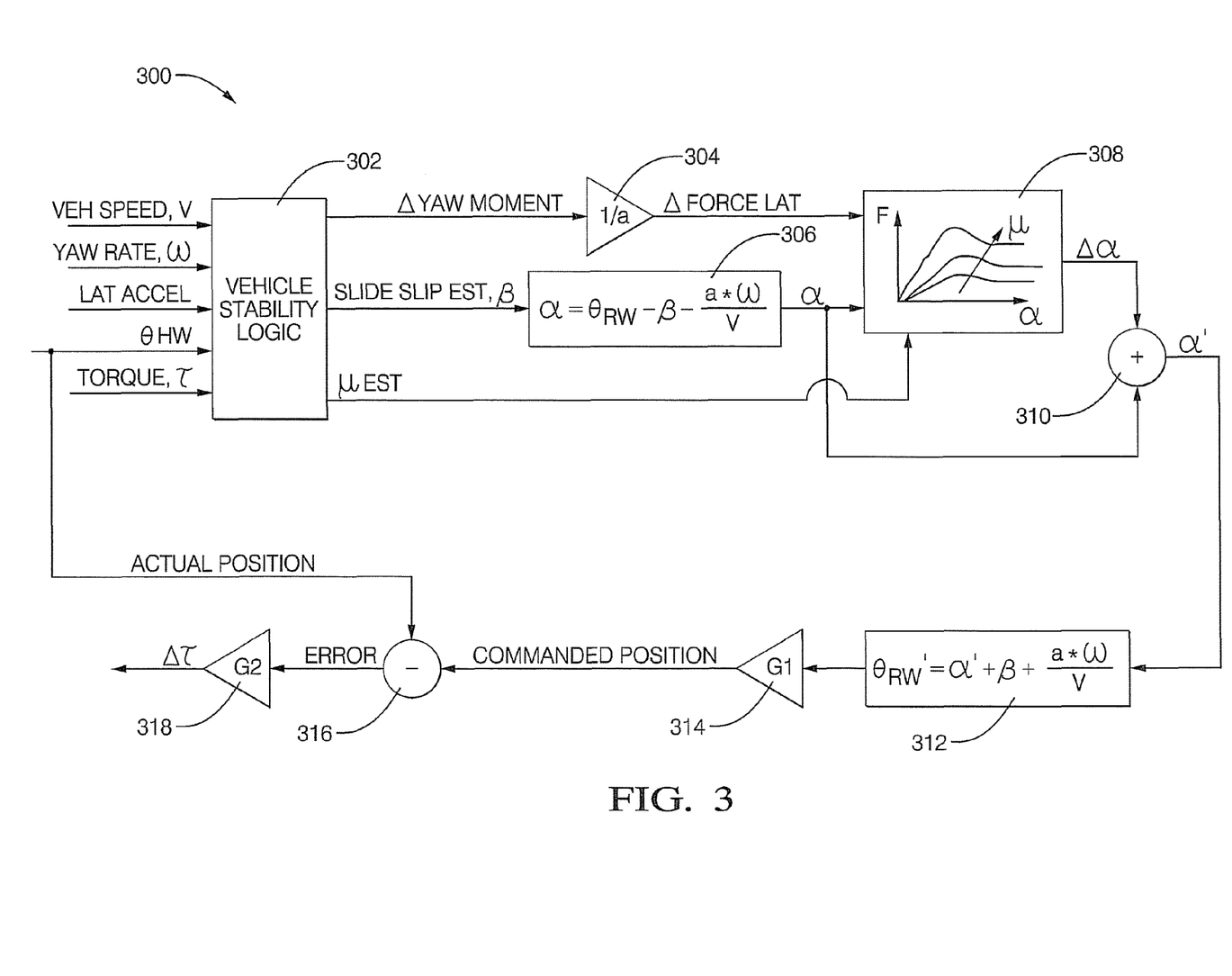
FIG. 3 illustrates one example of a dataflow diagram for calculating a torque overlay command in accordance with exemplary embodiments.

Turning now to FIG. 3, a dataflow diagram 300 for calculating a torque overlay command via the controller 122 will now be described in accordance with exemplary embodiments. A vehicle stability logic block 302 may receive various vehicle sensor signals such as a vehicle speed (V) from the vehicle speed sensor 124, a yaw rate ($\omega$) from the yaw rate sensor 126, a lateral acceleration ($a_{Lat}$) from the lateral acceleration sensor 128, a hand wheel angle ($\theta_{HW}$) from the hand wheel angle sensor 116, and a steering torque ($\tau$) from the torque sensor 118. The vehicle stability logic block 302 may use this data, with the exception of ($\tau$), to generate a vehicle stability command ($\Delta$ Yaw Moment or corrections needed in vehicle yaw moment), an estimated vehicle slip angle ($\beta$) and an estimated coefficient of friction ($\mu$). The estimated vehicle slip angle ($\beta$) may be derived from measured vehicle conditions. In exemplary embodiments, the estimated vehicle slip angle ($\beta$) may be estimated using a closed loop observer calculation that relies on knowledge of certain vehicle parameters such as mass, wheelbase, and tire cornering stiffness, along with instantaneous measurements from input sensors. The estimated coefficient of friction ($\mu$) may be derived from measured vehicle conditions. In exemplary embodiments, the estimated coefficient of friction ($\mu$) is estimated by determining when the vehicle tire's lateral forces are in a saturation condition, and then using the lateral acceleration ($a_{Lat}$), as measured by the lateral acceleration sensor 128 of FIG. 1, as an indicator of surface friction capability. The vehicle stability command may be calculated in response to vehicle motion derived from measured vehicle conditions. The vehicle motion may include oversteer, understeer, or rollover. In exemplary embodiments, the vehicle stability command may be derived from the following sequence of calculations:

1. Determine a target yaw rate based on the handwheel angle ($\theta_{HW}$) and the vehicle speed (V).

2. Determine a yaw rate error as a difference between the target yaw rate and the vehicle yaw rate ($\omega$).

3. Determine a yaw moment command ($\Delta$ Yaw Moment) based on the yaw rate error, estimated vehicle slip angle ($\beta$), and roll motion.

It is understood that further improvements in estimation of surface coefficient ($\mu$) are possible when steering specific signals such as ($\tau$), ($\theta_{HW}$), are considered along with vehicle data (V), ($\omega$), and lateral acceleration ($a_{Lat}$). The vehicle stability command may be converted to a change in lateral force ($\Delta$ Force Lat) through a gain block 304 that multiplies the vehicle stability command ($\Delta$ Yaw Moment) by the reciprocal of the distance between the front axle 108 and the center of gravity of the vehicle 100 (1/a). The current tire side slip angle ($\alpha$) may be calculated through a transfer function block 306 as:

$$\alpha = \theta_{RW} - \beta - \frac{a*\omega}{V}$$

A lookup table block 308 may be used to determine a change in tire side slip angle ($\Delta\alpha$) based on the change in lateral force ($\Delta$ Force Lat) and the estimated coefficient of friction ($\mu$). The lookup table block 308 may contain one or more relational curves for lateral force versus tire side slip angle (F vs. $\alpha$). In exemplary embodiments, an F vs. $\alpha$ curve may be selected based upon $\mu$. A new tire side slip angle ($\alpha'$) may be calculated at a summation block 310 as the sum of $\alpha+\Delta\alpha$. A transfer function block 312 may use the new tire side slip angle ($\alpha'$) to calculate a new road wheel angle ($\theta_{RW}'$) as:

$$\theta_{RW}' = \alpha' + \beta + \frac{a*\omega}{V}$$

A gain block 314 may multiply the new road wheel angle ($\theta_{RW}'$) by a gain (G1) to produce a commanded hand wheel angle ($\theta_{HW}'$). An error signal may be calculated at a subtraction block 316 by subtracting the actual hand wheel angle ($\theta_{HW}$) from the commanded hand wheel position angle ($\theta_{HW}'$). A torque overlay command ($\Delta\tau$) may be produced through multiplying the error signal by a gain (G2) at a gain block 318. The gain block 318 converts the error signal, a change in hand wheel angle, into a torque command that may be applied to the steering actuator 120 of FIG. 1. It is understood that both gain blocks 314 and 318 may not be constants and could vary as functions of precise geometrical relationships, or other signals available to the system 300, such as the vehicle speed (V), or other measured vehicle conditions.

Figure 4:
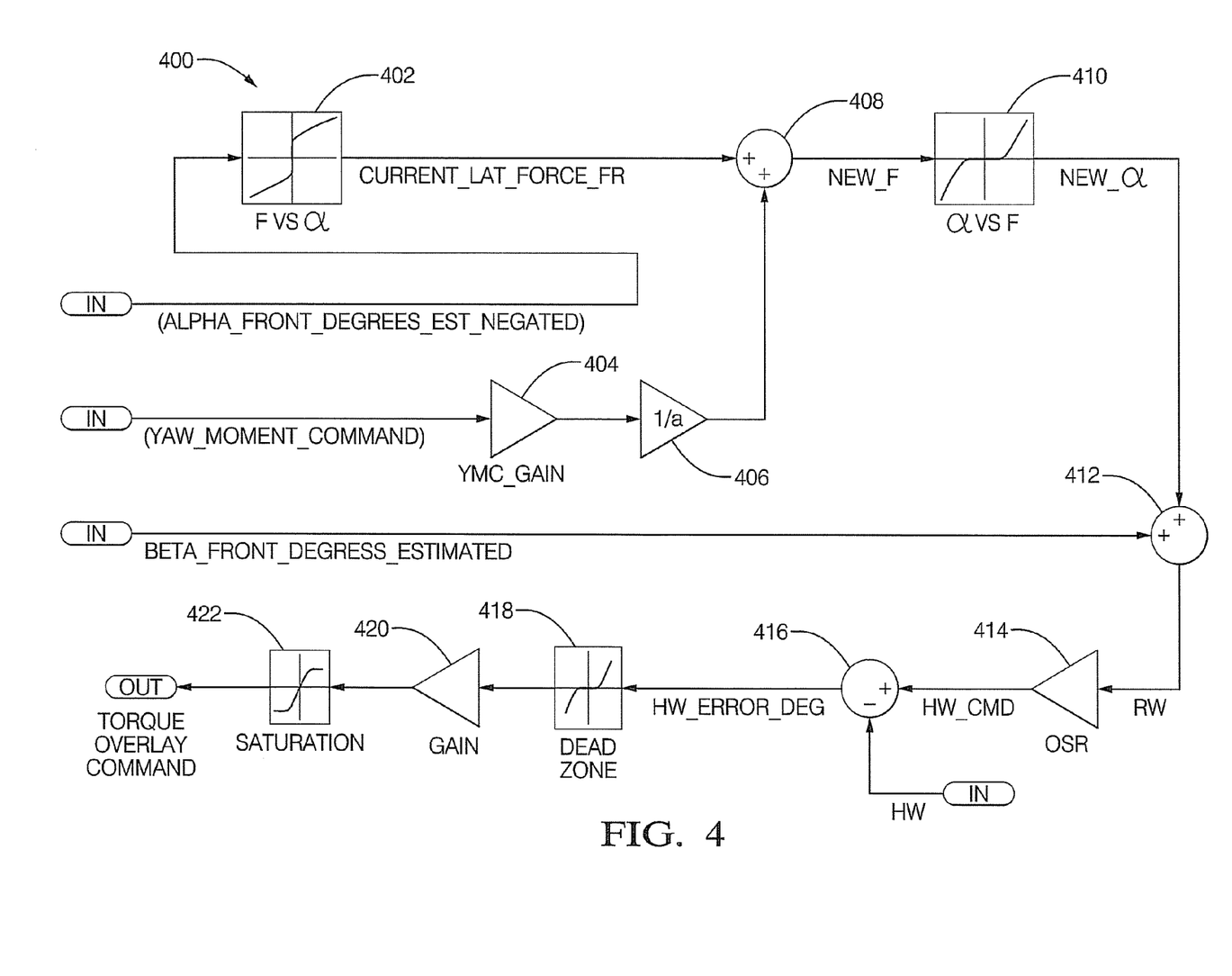
FIG. 4 illustrates another example of a dataflow diagram for calculating a torque overlay command in accordance with alternative exemplary embodiments.

Turning now to FIG. 4, a dataflow diagram 400 for calculating a torque overlay command will now be described in accordance with further exemplary embodiments. The torque overlay command logic of the dataflow diagram 400 may receive input signals including an estimated front tire side slip angle, an estimated front vehicle slip angle, a $\Delta$ yaw moment command, and a hand wheel angle. In exemplary embodiments, it may be advantageous, depending upon the shape of an F vs. $\alpha$ curve under consideration, to determine a new front tire side slip angle using two versions of an F vs. $\alpha$ curve, rather than using the lookup table block 308 and the summation block 310 of FIG. 3. At lookup table block 402, the estimated front tire side slip angle is used to determine a current front lateral force through an F vs. $\alpha$ curve. A delta lateral force may be calculated by multiplying the vehicle $\Delta$yaw moment command by a command gain and 1/a through gain blocks 404 and 406. The gain block 406 may be equivalent to the gain block 304 of FIG. 3. The current front lateral force and the delta front lateral force may be added through a summation block 408 to produce a new front lateral force. At lookup table block 410, the new front lateral force is used to determine a new front tire side slip angle through an $\alpha$ vs. F curve. In exemplary embodiments, the F vs. $\alpha$ curve of the lookup table block 402 and the $\alpha$ vs. F curve of the lookup table block 410 are inversely related using a common curve to lookup the desired variable. Furthermore, there may be a family of curves that vary based upon the coefficient of friction (not shown in FIG. 4). The F vs. $\alpha$ curve may be developed empirically using a data fitting process such as collecting force data as the hand wheel angle is increased, followed by filtering noise, and performing a final curve fit.

A commanded road wheel angle may be calculated by adding the new front tire side slip angle with the estimated front vehicle slip angle through a summation block 412. In exemplary embodiments, the estimated front vehicle slip angle received by the torque overlay command logic of dataflow 400 already includes an offset accounting for $$\frac{a*\omega}{V}.$$

The commanded road wheel angle may be converted to a hand wheel angle command through multiplication by an overall steering ratio using a gain block 414. The gain block 414, OSR, may be equivalent to the gain block 314 of FIG. 3. As such, it too may include complicated nonlinear relationships. A hand wheel error signal may be calculated by subtracting the current hand wheel angle from the hand wheel angle command using a subtraction block 416.

The hand wheel error signal may pass through a dead zone block 418, a gain block 420, and a saturation limit block 422, resulting in a torque overlay command. The dead zone block 418 may insure against minor torque changes due to small variations in the inputs to the torque overlay command logic in dataflow 400. The dead zone block 418 may be removed for increased computational efficiency. The gain block 420 may amplify the hand wheel error signal into a torque value based on the desired relationship between the hand wheel angle error and torque for the vehicle 100. The gain block 420 may be equivalent to the gain block 318 of FIG. 3. As such, it too may include complicated nonlinear relationships. The saturation limit block 422 may establish upper and lower torque limits to maintain a torque command within the performance capability of the steering actuator 120. The torque overlay command output from the saturation limit block 422 may be applied to the steeling actuator 120.

In further exemplary embodiments, it may be possible to calculate a torque overlay command based on the vehicle yaw moment command without including the vehicle slip angle. This may be performed because $\Delta\theta_{HW}$ which is the input to block 418 is $=OSR*\Delta\theta_{RW}=(\alpha'+\text{front beta})-(\alpha+\text{front beta}) =OSR*(\alpha'-\alpha)=OSR*\Delta\alpha$. Therefore, the computation of the torque overlay command may be based on changes in changes in $\alpha$.

Figure 5:
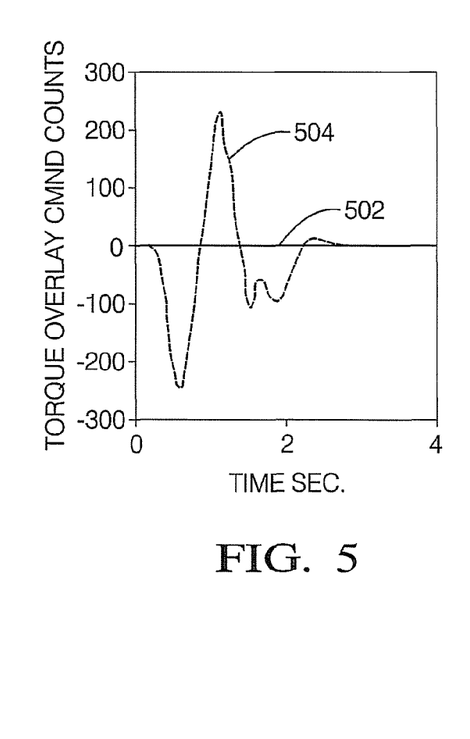
FIG. 5 illustrates one example of a torque overlay command output in counts versus time during a lane change maneuver in accordance with exemplary embodiments.

Turning now to FIGS. 5-10, example data is plotted as a comparison between performance of a vehicle both with and without a torque overlay command for a lane change maneuver on dry surface at fifty miles-per-hour in accordance with exemplary embodiments. FIG. 5 depicts a torque overlay command output in counts versus time during the lane change maneuver. Line 502 represents the torque overlay command output for the vehicle when torque overlay command logic is disabled. Line 504 represents the torque overlay command output for the vehicle when torque overlay command logic is enabled.

Figure 6:
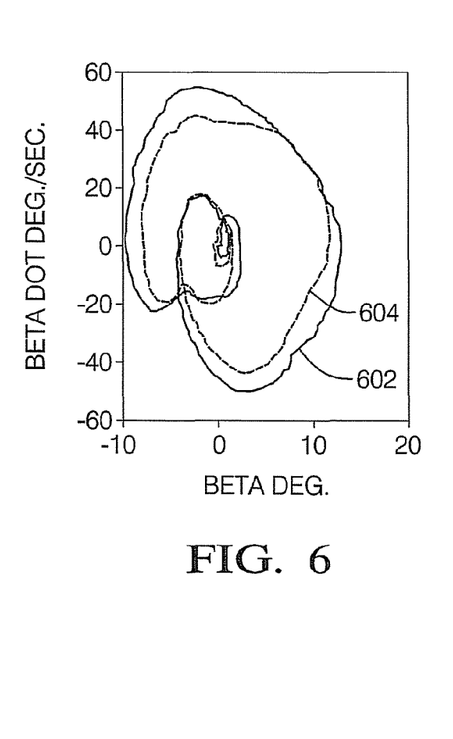
FIG. 6 illustrates one example of a rate of change in vehicle slip angle versus vehicle slip angle during a lane change maneuver in accordance with exemplary embodiments.

FIG. 6 depicts a rate of change in vehicle slip angle rate (beta dot) versus vehicle slip angle (beta) during the lane change maneuver. FIG. 6 provides an indication of the vehicle activity as a phase plot. Line 602 represents the vehicle activity when torque overlay command logic is disabled. Line 604 represents the vehicle activity when torque overlay command logic is enabled. The reduced radius of line 604 in comparison to line 602 shows that the vehicle is less active or more stable when torque overlay command logic is enabled.

Figure 7:
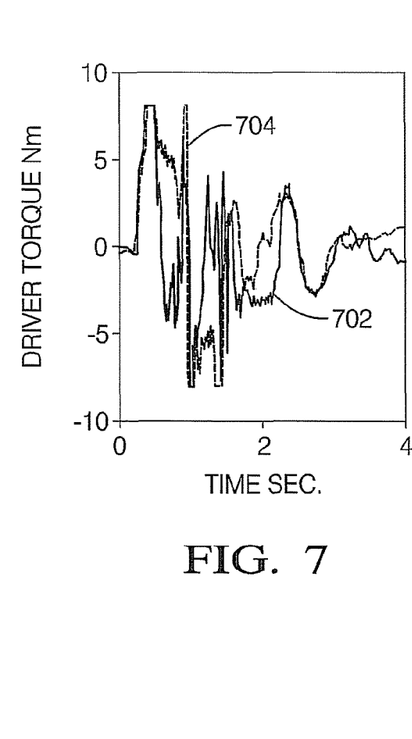
FIG. 7 illustrates one example of a steering torque exerted by a driver of a vehicle versus time during a lane change maneuver in accordance with exemplary embodiments.

FIG. 7 depicts a steering torque exerted by the driver of the vehicle versus time during the lane change maneuver. Line 702 represent driver torque when torque overlay command logic is disabled. Line 704 represent driver torque when torque overlay command logic is enabled.

Figure 8:
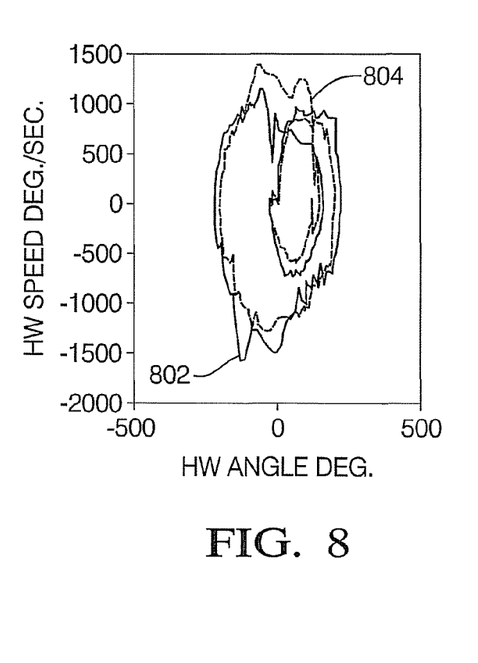
FIG. 8 illustrates one example of hand wheel speed versus hand wheel angle during a lane change maneuver in accordance with exemplary embodiments.

FIG. 8 depicts hand wheel speed versus hand wheel angle during the lane change maneuver. Line 802 represents the hand wheel activity when torque overlay command logic is disabled. Line 804 represents the hand wheel activity when torque overlay command logic is enabled. Again, the reduced radius of line 804 in comparison to line 802 indicates that the driver is less active when torque overlay command logic is enabled.

Figure 9:
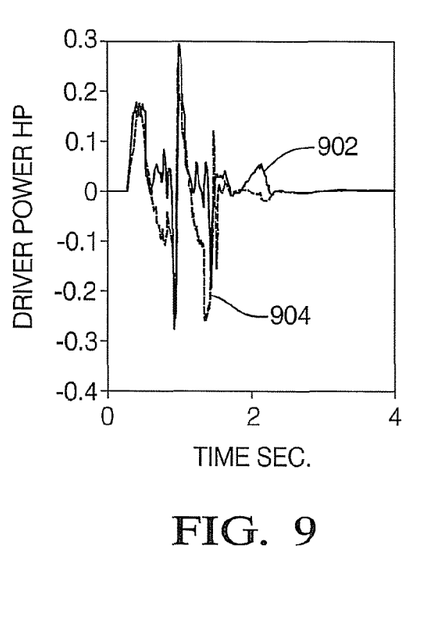
FIG. 9 illustrates one example of power exerted by a driver of a vehicle versus time during a lane change maneuver in accordance with exemplary embodiments.

FIG. 9 depicts power, P, exerted by the driver of the vehicle in horsepower versus time during the lane change maneuver. P is defined as the product of driver torque as measured by the product of driver torque, ($\tau$), and hand wheel speed, d/dt ($\theta_{HW}$). Line 902 represent driver power when torque overlay command logic is disabled. Line 904 represent driver power when torque overlay command logic is enabled. Therefore, FIG. 9 illustrates that enabling torque overlay reduces the power expended by the driver.

Figure 10:
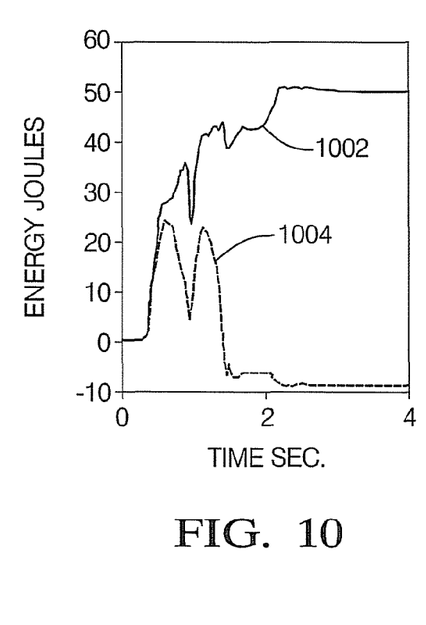
FIG. 10 illustrates one example of energy exerted by a driver of a vehicle versus time during a lane change maneuver in accordance with exemplary embodiments.

FIG. 10 may be the best indicator of driver activity, as it depicts the total energy, e, utilized by the driver of the vehicle in Joules versus time during the lane change maneuver. Mathematically, $e=\int Pdt$. Line 1002 represent driver energy when torque overlay command logic is disabled. Line 1004 represent driver energy when torque overlay command logic is enabled. The driver total input energy shown in FIG. 10 indicates that the driver activity is lowered when torque overlay command logic is enabled. The negative total energy shown in line 1004 suggests that work is being done to the driver, primarily by the (power) steering system. Through activation of the torque overlay command logic, the steering actuator 120 performs work that the driver had to do otherwise.

As described above, the above-described method can be embodied in the form of computer-implemented software algorithms and apparatuses for practicing those processes. In an exemplary embodiment, the method is embodied in computer program code executed by one or more elements. The present method may be embodied in the form of computer program code containing instructions stored in tangible media, such as floppy diskettes, CD-ROMs, hard drives, flash memory, or any other computer-readable storage medium, wherein, when the computer program code is loaded into and executed by a computer, the computer becomes an apparatus for practicing the invention.

While the invention has been described with reference to exemplary embodiments, it will be understood by those of ordinary skill in the pertinent art that various changes may be made and equivalents may be substituted for the elements thereof without departing from the scope of the present disclosure. In addition, numerous modifications may be made to adapt the teachings of the disclosure to a particular object or situation without departing from the essential scope thereof. Therefore, it is intended that the Claims not be limited to the particular embodiments disclosed as the currently preferred best modes contemplated for carrying out the teachings herein, but that the Claims shall cover all embodiments falling within the true scope and spirit of the disclosure.

What is claimed is:

1. A system for calculating a torque overlay command in a steering control system, the system comprising:
   a hand wheel angle sensor;
   a yaw rate sensor;
   a control system, the control system performing:
      receiving a current hand wheel angle from the hand wheel angle sensor;

determining a change in vehicle yaw moment command;
calculating a lateral force in response to the change in vehicle yaw moment command;
determining a new tire side slip angle from the lateral force;
calculating a commanded hand wheel angle from the new tire side slip angle;
calculating an error signal as a difference between the commanded hand wheel angle and the current hand wheel angle;
generating the torque overlay command from the error signal;
calculating a vehicle slip angle; and
calculating a commanded road wheel angle, comprising:
  summing the new tire side slip angle and the vehicle slip angle; and
  converting the commanded road wheel angle into a commanded hand wheel angle.

2. The system of 1, wherein the system further comprises:
a vehicle speed sensor; and
calculating a commanded road wheel angle further comprises:
  calculating an offset value as a product of a distance between a steering axle and a center of gravity of the vehicle times a yaw rate of the vehicle;
  dividing the offset value by a longitudinal velocity of the vehicle; and
  adding the offset value to the summation of the new tire side slip angle and the vehicle slip angle.

3. A system for calculating a torque overlay command in a steering control system, the system comprising:
  a hand wheel angle sensor;
  a yaw rate sensor;
  a control system, the control system performing:
    receiving a current hand wheel angle from the hand wheel angle sensor;
    determining a change in vehicle yaw moment command;
    calculating a lateral force in response to the change in vehicle yaw moment command;
    determining a new tire side slip angle from the lateral force;
    calculating a commanded hand wheel angle from the new tire side slip angle;
    calculating an error signal as a difference between the commanded hand wheel angle and the current hand wheel angle;
    generating the torque overlay command from the error signal;
    providing a steering actuator; and
  adding the torque overlay command to the steering actuator output.

4. The system of claim 3, wherein the change in vehicle yaw moment command is generated as a function of the current hand wheel angle, vehicle speed, yaw rate, and lateral acceleration.

* * * * *